United States Patent
Yoshikawa et al.

(10) Patent No.: US 9,434,405 B2
(45) Date of Patent: Sep. 6, 2016

(54) ELECTRIC POWER STEERING DEVICE AND SHAFT COUPLER USED THEREFOR

(71) Applicant: KAYABA INDUSTRY CO., LTD., Minato-ku, Tokyo (JP)

(72) Inventors: Shinraku Yoshikawa, Gifu (JP); Tetsurou Shimizu, Aichi (JP); Katsumi Shimoda, Gifu (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 14/380,393

(22) PCT Filed: Feb. 4, 2013

(86) PCT No.: PCT/JP2013/052502
§ 371 (c)(1),
(2) Date: Aug. 22, 2014

(87) PCT Pub. No.: WO2013/125337
PCT Pub. Date: Aug. 29, 2013

(65) Prior Publication Data
US 2015/0041241 A1    Feb. 12, 2015

(30) Foreign Application Priority Data
Feb. 24, 2012 (JP) .................. 2012-039177

(51) Int. Cl.
*B62D 5/04* (2006.01)
*F16D 3/68* (2006.01)
*F16D 3/12* (2006.01)

(52) U.S. Cl.
CPC ........... *B62D 5/0403* (2013.01); *B62D 5/0409* (2013.01); *F16D 3/12* (2013.01); *F16D 3/68* (2013.01)

(58) Field of Classification Search
CPC ......... F16D 3/12; F16D 3/68; B62D 5/0403; B62D 5/0409

USPC ............... 464/72, 73, 76; 180/444
See application file for complete search history.

(56) References Cited

U.S. PATENT DOCUMENTS

| | | | | |
|---|---|---|---|---|
| 2,301,659 A | * | 11/1942 | Ricefield | F16D 3/68 464/73 |
| 2,924,082 A | * | 2/1960 | Reich | F16D 3/68 464/76 |
| 6,900,564 B2 | * | 5/2005 | Kobayashi | B62D 5/0409 180/444 |
| 7,228,933 B2 | * | 6/2007 | Joushita | F16D 3/68 180/444 X |
| 2011/0240399 A1 | * | 10/2011 | Suzuki | B62D 5/0409 180/444 |

FOREIGN PATENT DOCUMENTS

| FR | 1.104.652 | * | 11/1955 | .................... 464/76 |
|---|---|---|---|---|
| GB | 2 047 384 A | * | 11/1980 | .................... 464/76 |

(Continued)

OTHER PUBLICATIONS

International Search Report and Written Opinion mailed Mar. 5, 2013, corresponding International Application No. PCT/JP2013/052502.

*Primary Examiner* — Gregory Binda
(74) *Attorney, Agent, or Firm* — Hauptman Ham, LLP

(57) ABSTRACT

A shaft coupler that couples a worm shaft and an output shaft of an electric motor in an electric power steering device includes a joint on a motor side that is connected to the output shaft, a joint on a worm side that is connected to the worm shaft, and a coupling that is provided between the joints and that is for transmitting rotational torque of the electric motor to the worm shaft. The joint on the motor side and the joint on the worm side, each having a plurality of protrusion parts that extend in an axial direction, are arranged so that the protrusion parts are aligned alternately in a circumferential direction. The coupling is formed by a plurality of caps that are fitted to the protrusion parts of the joint on the motor side or the joint on the worm side.

5 Claims, 7 Drawing Sheets

(56) References Cited

FOREIGN PATENT DOCUMENTS

| JP | 54127048 U | 9/1979 |
|---|---|---|
| JP | 56166328 U | 12/1981 |
| JP | 2001301630 A | 10/2001 |
| JP | 2001354148 A | 12/2001 |
| JP | 2005306141 A | 11/2005 |
| JP | 2011207457 A | 10/2011 |
| WO | 2005116473 A1 | 12/2005 |
| WO | 2008/129821 A1 | 10/2008 |

* cited by examiner

ELECTRIC POWER STEERING DEVICE AND SHAFT COUPLER USED THEREFOR

TECHNICAL FIELD

The present invention relates to a shaft coupler that couples a worm shaft and an output shaft of an electric motor in an electric power steering device.

BACKGROUND ART

In general, an electric power steering device is configured to bias a worm shaft toward a worm wheel side in order to reduce backlash of a worm reduction gear. As the worm shaft is tilted around a bearing that is provided on an electric motor side, axial misalignment is caused at the position where the worm shaft and an output shaft of the electric motor are coupled. A joint that permits the axial misalignment and transmits rotational torque of the electric motor to the worm shaft becomes necessary.

As a shaft coupler having the joint of this kind, WO2005/116473 discloses a shaft coupler including a coupling base body that is coupled to a rotating shaft, a coupling base body that is coupled to a steering shaft, and a pair of rotation transmission members that is arranged between the rotating shaft and the steering shaft via the coupling base bodies and that transmits rotation of the rotating shaft to the steering shaft, in which each of the rotation transmission members includes an annular base part and a pair of projection parts that is provided on the base part in an integrated manner to be projected in the radial direction.

SUMMARY OF INVENTION

However, the shaft coupler according to WO2005/116473 has such a shape that each of the rotation transmission members, as the joint, is formed by one component in which the base part and the projection parts are integrated. Therefore, when the worm shaft is tilted with respect to the output shaft of the electric motor, and the rotation transmission members permit the axial misalignment between the worm shaft and the output shaft of the electric motor, tilting torque of the worm shaft is increased and the worm shaft is not tilted smoothly. In this case, backlash reduction of the worm reduction gear becomes unstable.

The present invention is made in view of the above-described problem, and its object is to reduce the backlash of the worm reduction gear in a stable manner.

According to one aspect of this invention, a shaft coupler that couples a worm shaft and an output shaft of an electric motor in an electric power steering device is provided. The shaft coupler includes a joint on a motor side that is connected to the output shaft of the electric motor, a joint on a worm side that is connected to the worm shaft, and a coupling that is provided between the joint on the motor side and the joint on the worm side and that is for transmitting rotational torque of the electric motor to the worm shaft, wherein the joint on the motor side and the joint on the worm side, each having a plurality of protrusion parts that extend in an axial direction, are arranged so that the protrusion parts are aligned alternately in a circumferential direction, and wherein the coupling is formed by a plurality of caps that are fitted to the protrusion parts of the joint on the motor side or the joint on the worm side.

Embodiments of the present invention and advantages thereof are described in detail below with reference to the accompanying drawings.

DESCRIPTION OF EMBODIMENTS

Figure 1:
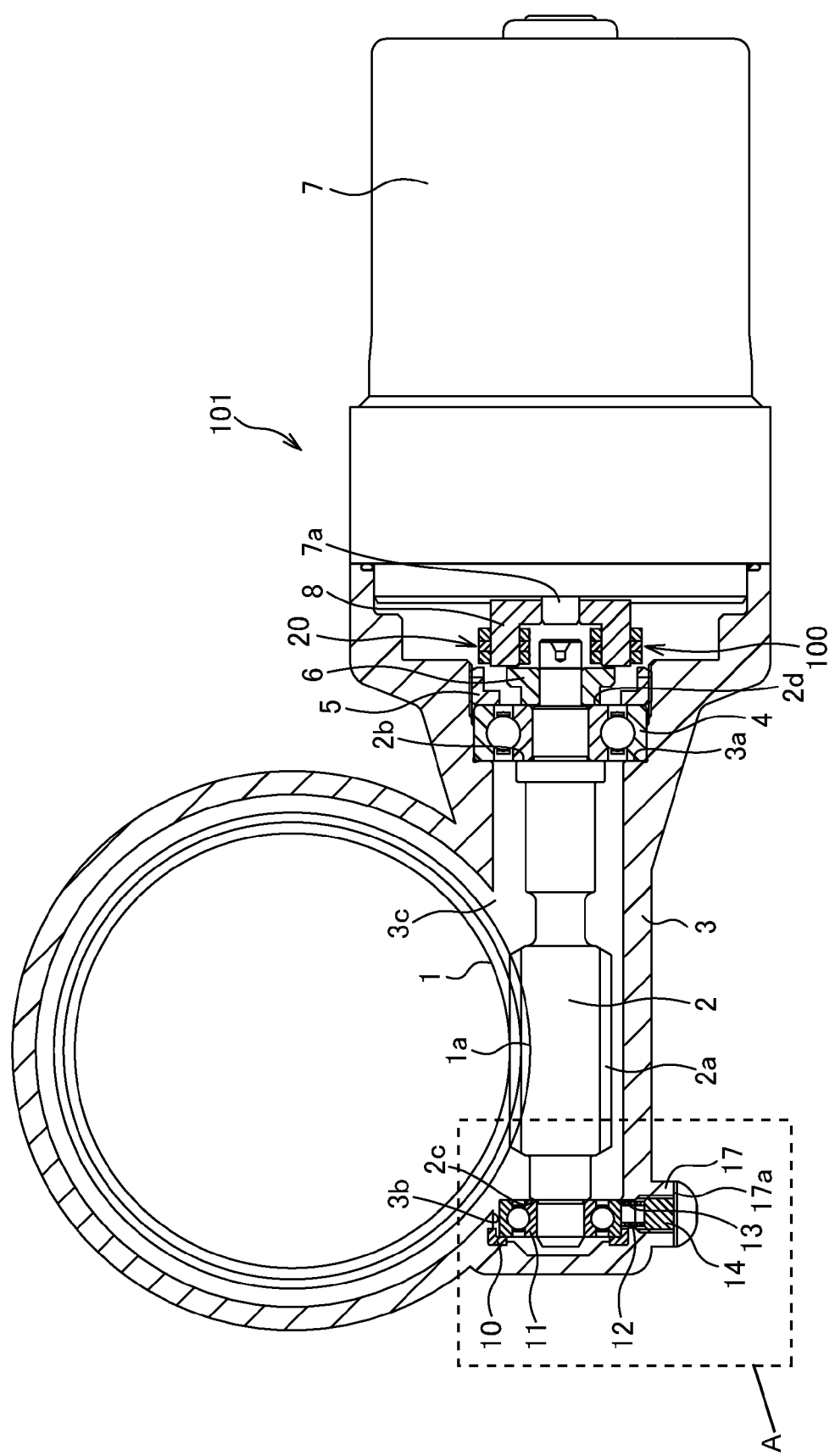
FIG. 1 is a cross-sectional view illustrating an electric power steering device in which a shaft coupler according to an embodiment of the present invention is employed.

Hereinafter, an embodiment of the present invention will be explained with reference to the drawings.

A shaft coupler 100 according to the embodiment of the present invention couples a worm shaft 2 and an output shaft 7a of an electric motor 7 in an electric power steering device 101.

First, the electric power steering device 101 will be explained with reference to FIG. 1.

The electric power steering device 101 is a device that is mounted on a vehicle and that assists a steering force applied to a steering wheel by a driver.

The electric power steering device 101 is provided with a worm wheel 1 that is provided on a steering shaft linked to the steering wheel, the worm shaft 2 that meshes with the worm wheel 1, and the electric motor 7 that is coupled to the worm shaft 2 via the shaft coupler 100. When the electric motor 7 is driven, the worm shaft 2 is rotated, and the rotation of the worm shaft 2 is reduced in speed and transmitted to the worm wheel 1. The worm wheel 1 and the worm shaft 2 form a worm reduction gear.

The shaft coupler 100 couples the worm shaft 2 and the output shaft 7a of the electric motor 7. The shaft coupler 100 will be explained later in detail.

Torque outputted from the electric motor 7 is transmitted from the worm shaft 2 to the worm wheel 1 and given to the steering shaft as assist torque. The torque outputted from the electric motor 7 corresponds to steering torque obtained by a computation based on a twist amount of a torsion bar that is twisted by relative rotation of an input shaft and an output shaft forming the steering shaft.

The worm shaft 2 is housed in a gear case 3 that is made of metal. A teeth part 2a that meshes with a teeth part 1a of the worm wheel 1 is formed on a part of the worm shaft 2. An opening part 3c is formed in the inner peripheral surface of the gear case 3 at the position corresponding to the teeth part 2a, and the teeth part 2a of the worm shaft 2 and the teeth part 1a of the worm wheel 1 mesh with each other via the opening part 3c.

The base end side of the worm shaft 2, as the electric motor 7 side, is rotatably supported by a first bearing 4. The first bearing 4 has a ball interposed between an inner ring and an outer ring that are annular in shape. The outer ring of the first bearing 4 is sandwiched between a step part 3a that is formed on the gear case 3 and a locknut 5. The inner ring of the first bearing 4 is sandwiched between a step part 2b of the worm shaft 2 and a joint on the worm side 6 that is connected to the worm shaft 2. Thereby, movement of the worm shaft 2 in the axial direction is limited.

A second bearing 11 is accommodated at the bottom of the gear case 3 via an L-shaped ring 10, as an annular elastic member having an L-shaped cross section. The tip end side of the worm shaft 2 is rotatably supported by the second bearing 11. The second bearing 11 has a ball interposed between an inner ring and an outer ring that are annular in shape. A step part 2c that is formed near the tip end part of the worm shaft 2 is locked with the inner ring of the second bearing 11.

As the second bearing 11 is pressed against the step part 2c of the worm shaft 2 by a biasing force of the L-shaped ring 10, a rattle of the second bearing 11 in the axial direction is reduced. Namely, the L-shaped ring 10 is compressed by the bottom of the gear case 3 and the bottom of the second bearing 11, so as to press the second bearing 11 in the axial direction.

A flange part 17 that has a flat end surface 17a is projectingly formed on the outer peripheral surface of the gear case 3 on its end part side. A through hole 13 that is open to face the outer peripheral surface of the second bearing 11 is formed in the flange part 17. An opening part of the through hole 13 that is open in the end surface 17a of the flange part 17 is blocked by a plug 14.

Figure 1A:
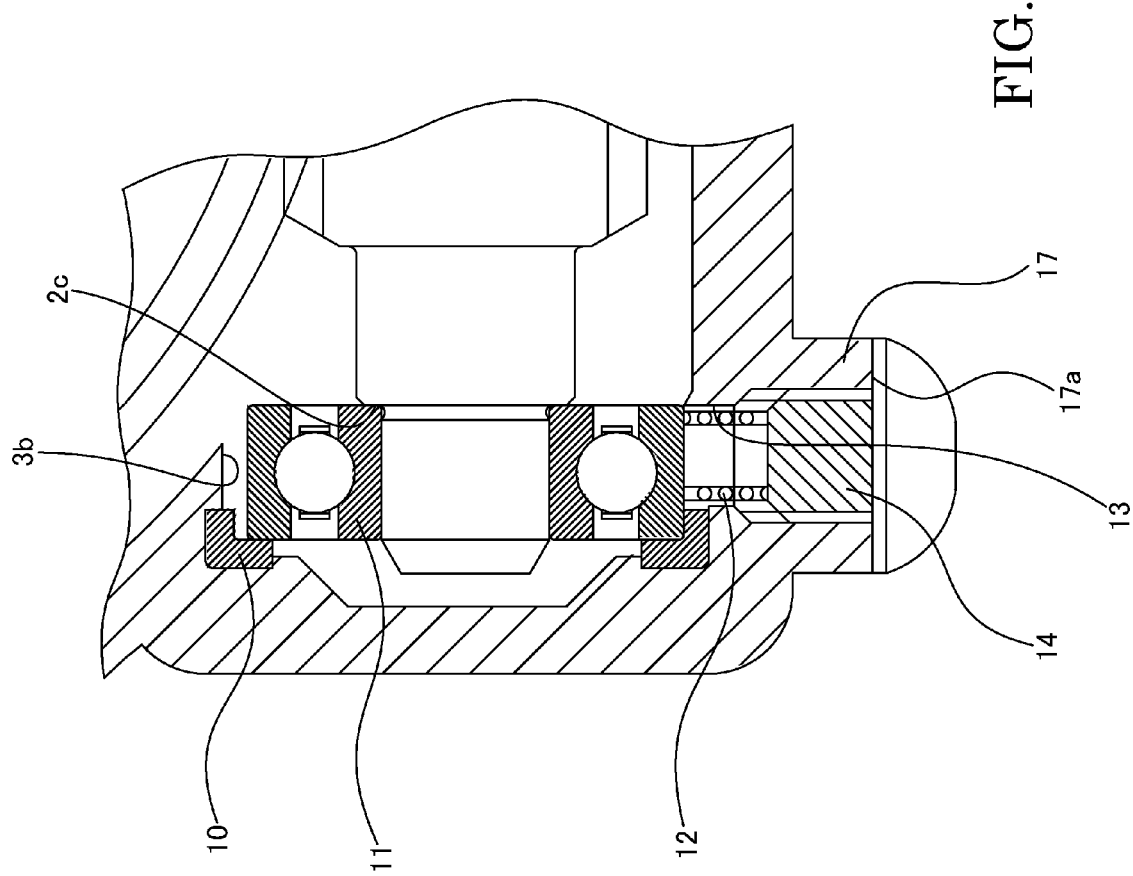
FIG. 1A is an enlarged view of region A in FIG. 1.

As best seen in FIG. 1A, a coil spring 12 serving as a biasing member compressed between the tip end surface of the plug 14 and the outer peripheral surface of the second bearing 11 is accommodated in the through hole 13. The coil spring 12 biases the second bearing 11 toward the direction in which a gap between the teeth part 2a of the worm shaft 2 and the teeth part 1a of the worm wheel 1 is reduced. Namely, the coil spring 12 biases the worm shaft 2 toward the worm wheel 1, via the second bearing 11.

An inner peripheral surface 3b of the gear case 3 that surrounds the outer peripheral surface of the second bearing 11 is formed to have a long hole shape so that the second bearing 11 can move toward the worm wheel 1 by a biasing force of the coil spring 12.

At an early stage when assembly of the worm shaft 2 into the gear case 3 is finished, the second bearing 11 is biased toward the worm wheel 1 side by the biasing force of the coil spring 12, and it is free of backlash. Under this state, the worm shaft 2 tilts by the biasing force of the coil spring 12 by using the first bearing 4 as a fulcrum, and the worm shaft 2 and the output shaft 7a of the electric motor 7 are axially misaligned. This axial misalignment between the worm shaft 2 and the output shaft 7a of the electric motor 7 is permitted by the shaft coupler 100.

When wear of the teeth parts 1a and 2a of the worm shaft 2 and the worm wheel 1 progresses along with the driving of the electric power steering device 101, the second bearing 11 moves inside the long hole of the gear case 3 by the biasing force of the coil spring 12, and the backlash between the teeth parts 1a and 2a of the worm shaft 2 and the worm wheel 1 is reduced. Therefore, in order to reduce the backlash in a stable manner, it is necessary that the axial misalignment between the worm shaft 2 and the output shaft 7a of the electric motor 7 is permitted by the shaft coupler 100, and the worm shaft 2 tilts smoothly with respect to the output shaft 7a of the electric motor 7.

Figure 2:
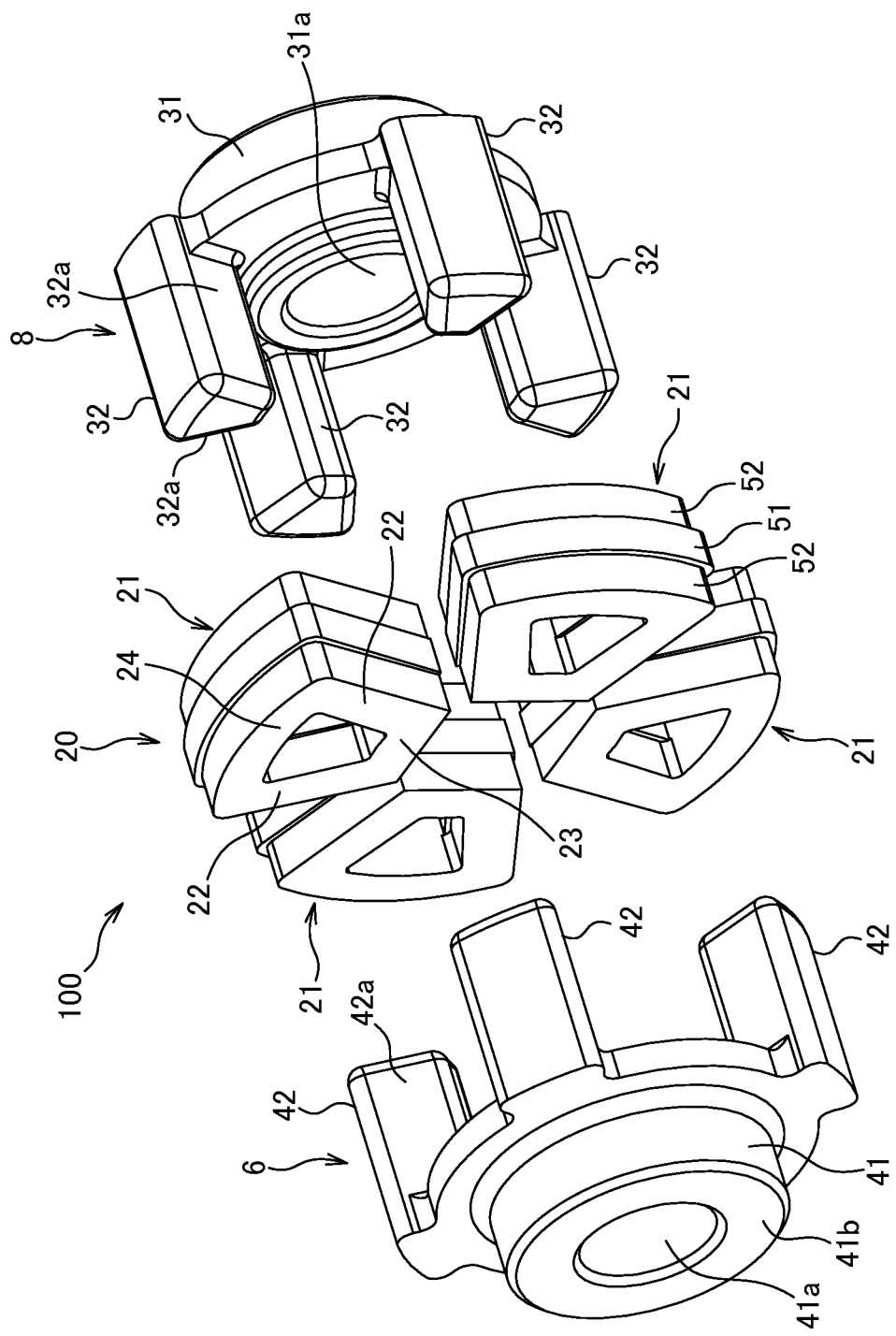
FIG. 2 is an exploded view of the shaft coupler according to the embodiment of the present invention.
Figure 3:
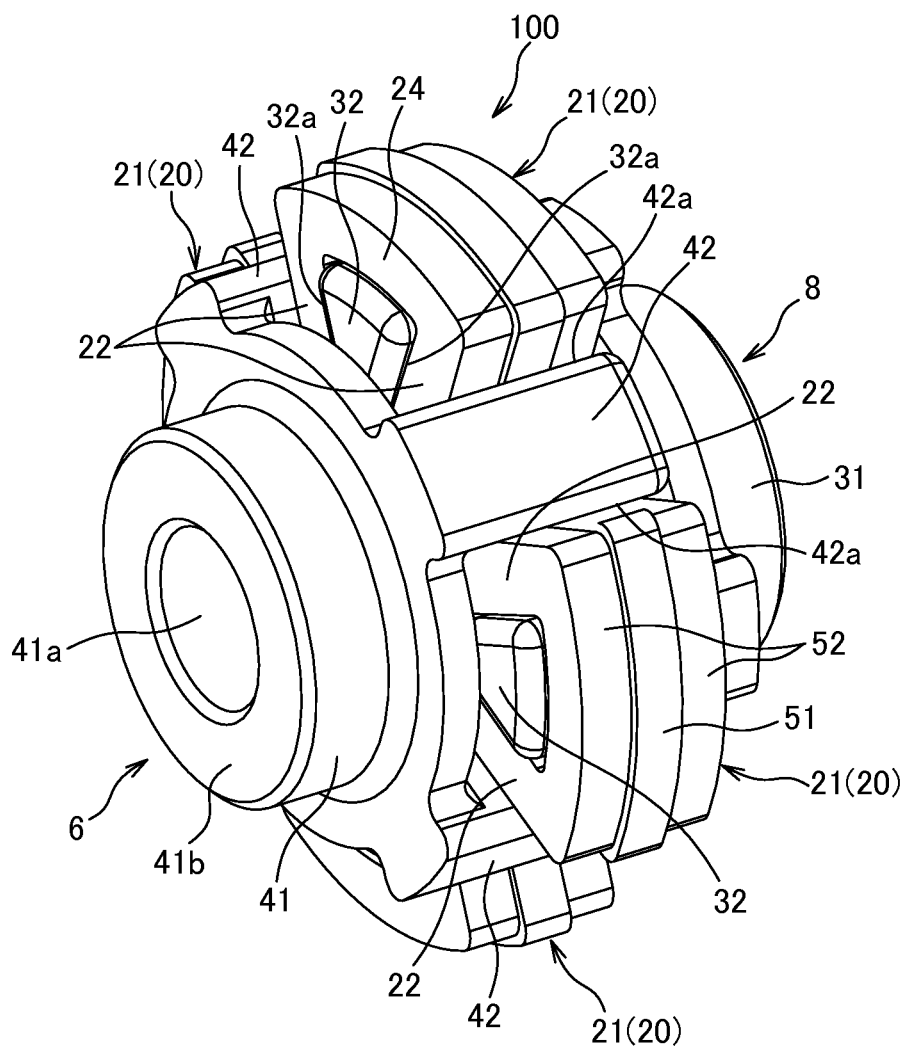
FIG. 3 is a perspective view of the shaft coupler according to the embodiment of the present invention.
Figure 4:
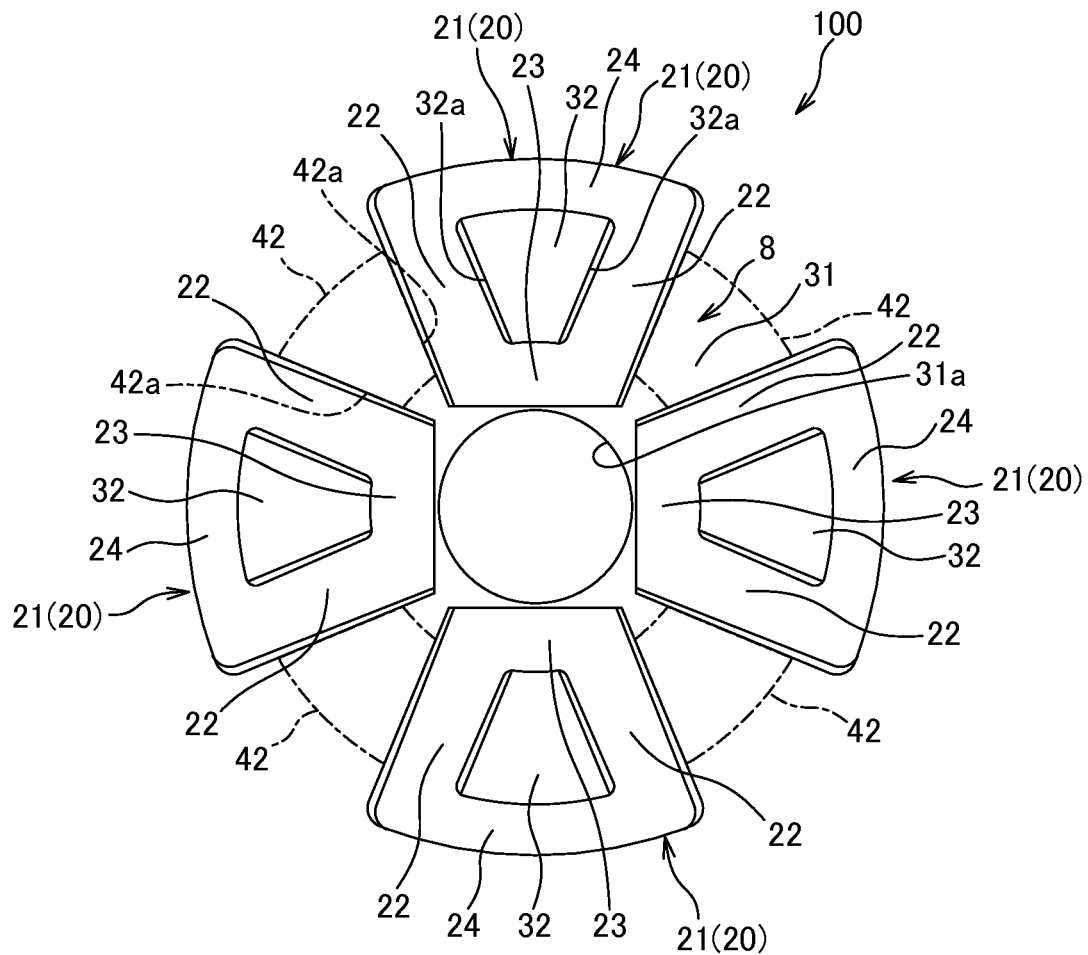
FIG. 4 is a plan view of the shaft coupler according to the embodiment of the present invention.

Next, the shaft coupler 100 will be explained mainly with reference to FIGS. 2 to 4. FIG. 2 is an exploded view of the shaft coupler 100, FIG. 3 is a perspective view of the shaft coupler 100, and FIG. 4 is a plan view of the shaft coupler 100.

The shaft coupler 100 is provided with a joint on the motor side 8 that is connected to the output shaft 7a of the electric motor 7, the joint on the worm side 6 that is connected to the worm shaft 2, and a coupling 20 that is provided between the joint on the motor side 8 and the joint on the worm side 6 and is for transmitting rotational torque of the electric motor 7 to the worm shaft 2.

The joint on the motor side 8 has an annular base part 31 in which a fit hole 31a, to be press-fitted to the outer peripheral surface on the tip end side of the output shaft 7a of the electric motor 7, is formed, and a plurality of protrusion parts 32 that are formed to protrude from the outer peripheral edge of the base part 31 and that extend in the axial direction. The joint on the motor side 8 is formed by steel material.

The joint on the motor side 8 is connected to the output shaft 7a by press-fitting the fit hole 31a to the outer peripheral surface on the tip end side of the output shaft 7a, so that coming-off and turning of the joint on the motor side 8 with respect to the output shaft 7a can be prevented. The connection method between the output shaft 7a and the joint on the motor side 8 is not limited to the press-fit, and other methods may be used as long as the coming-off and the turning of the joint on the motor side 8 with respect to the output shaft 7a can be prevented.

Four pieces of the protrusion parts 32 are formed and arranged in the circumferential direction at equal intervals. Each of the protrusion parts 32 is formed to have a substantially arc shape, as a whole, around the central axis of the base part 31. The outer peripheral surface of each of the protrusion parts 32 has a pair of plane surface parts 32a that extends in the substantially radial direction.

The joint on the worm side 6 has an annular base part 41 in which a fit hole 41a, to be press-fitted to the outer peripheral surface on the base end side of the worm shaft 2, is formed, and a plurality of protrusion parts 42 that are formed to protrude from the outer peripheral edge of the base part 41 and that extend in the axial direction. The joint on the worm side 6 is formed by the steel material.

The joint on the worm side 6 is connected to the worm shaft 2 by press-fitting the fit hole 41a to the outer peripheral surface on the base end side of the worm shaft 2, so that the coming-off and the turning of the joint on the worm side 6 with respect to the worm shaft 2 can be prevented. The joint on the worm side 6 is press-fitted to the outer peripheral surface on the base end side of the worm shaft 2 until an end surface 41b of the base part 41 abuts against a step part 2d of the worm shaft 2 and the inner ring of the first bearing 4. The connection method between the worm shaft 2 and the joint on the worm side 6 is not limited to the press-fit, similarly to the joint on the motor side 8.

Four pieces of the protrusion parts 42 are formed and arranged in the circumferential direction at equal intervals. Each of the protrusion parts 42 is formed to have a substantially arc shape, as a whole, around the central axis of the base part 41. The outer peripheral surface of each of the protrusion parts 42 has a pair of plane surface parts 42a that extends in the substantially radial direction.

The joint on the motor side 8 and the joint on the worm side 6 are equal in shape and, as illustrated in FIG. 3 and FIG. 4, arranged to face each other so that the protrusion parts 32 and 42 are arranged alternately at equal intervals in the circumferential direction. In FIG. 4, the protrusion parts 42 of the joint on the worm side 6 are illustrated by alternate long and short dashed lines.

The coupling 20 is formed by a plurality of independent caps 21 that are fitted to the respective protrusion parts 32 of the joint on the motor side 8. Thus, the coupling 20 has a divided structure that is formed by the plurality of caps 21. According to this embodiment, the coupling 20 is formed by the four caps 21 that are equal in number to the protrusion parts 32 of the joint on the motor side 8. The four caps 21 are equal in shape. FIG. 4 is a plan view in which the caps 21 are fitted to the respective protrusion parts 32 of the joint on the motor side 8. With regard to the joint on the worm side 6, only the protrusion parts 42 are illustrated by the alternate long and short dashed lines.

Each of the caps 21 has a ring shape whose inner peripheral surface corresponds to the outer peripheral surface of each of the protrusion parts 32, and is fitted to the outer peripheral surface of the protrusion part 32. The cap 21 is formed by a pair of torque transmission parts 22 that is sandwiched between the plane surface part 32a and the plane surface part 42a of the neighboring protrusion parts 32 and 42 of the joint on the motor side 8 and the joint on the worm side 6 and that is for transmitting the rotational torque of the electric motor 7 to the worm shaft 2, an inner peripheral part 23 that couples the end parts on the center side of the pair of torque transmission parts 22, and an outer peripheral part 24 that couples the end parts on the outer side of the pair of the torque transmission parts 22.

Each of the torque transmission parts 22 is formed to extend in the substantially radial direction so as to fit in a gap between the neighboring protrusion parts 32 and 42. Namely, the torque transmission parts 22 of the respective caps 21 are arranged radially around the output shaft 7a of the electric motor 7 (refer to FIG. 4). Thereby, the rotational torque of the electric motor 7 is transmitted from the protrusion parts 32 of the joint on the motor side 8 via the torque transmission parts 22 of the caps 21 to the protrusion parts 42 of the joint on the worm side 6, and is transmitted to the worm shaft 2.

The caps 21 may be fitted to the respective protrusion parts 42 of the joint on the worm side 6, instead of the respective protrusion parts 32 of the joint on the motor side 8. In other words, the caps 21 are fitted to the protrusion parts 32 of the joint on the motor side 8 or to the protrusion parts 42 of the joint on the worm side 6.

Each of the caps 21 is formed by a 3-layered structure, in which an elastic member 51 that is flexible and has relatively small rigidity, such as rubber, is sandwiched between a pair of resin members 52 that has relatively large rigidity. As the cap 21 is formed by the material having small rigidity and the material having large rigidity, the cap 21 is allowed to have flexible and rigid characteristics. Therefore, the cap 21 functions to transmit the rotational torque of the electric motor 7 to the worm shaft 2 efficiently, and to permit the axial misalignment between the worm shaft 2 and the output shaft 7a of the electric motor 7.

Each of the caps 21 may be formed by a 2-layered structure by the elastic member 51 that is flexible and has relatively small rigidity, and the resin member 52 that has relatively large rigidity.

Next, an assembling procedure of the shaft coupler 100 will be explained.

First, the fit hole 31a of the joint on the motor side 8 is press-fitted to the outer peripheral surface on the tip end side of the output shaft 7a of the electric motor 7, so as to connect the joint on the motor side 8 to the output shaft 7a.

Next, the four caps 21 are fitted to the respective protrusion parts 32 of the joint on the motor side 8.

Next, the respective protrusion parts 42 of the joint on the worm side 6 are inserted between the neighboring caps 21. Thereby, the torque transmission parts 22 of the caps 21 are sandwiched by the neighboring protrusion parts 32 and 42 of the joint on the motor side 8 and the joint on the worm side 6 (the state illustrated in FIGS. 3 and 4).

Finally, the fit hole 41a of the joint on the worm side 6 is press-fitted to the outer peripheral surface on the base end side of the worm shaft 2, so as to connect the joint on the worm side 6 to the worm shaft 2. Thus, the worm shaft 2 and the output shaft 7a of the electric motor 7 are coupled to each other via the shaft coupler 100.

When the caps 21 are fitted to the respective protrusion parts 42 of the joint on the worm side 6, the above-described procedure may be reversed. The caps 21 may be fitted to the protrusion parts 32 of the joint on the motor side 8 or to the protrusion parts 42 of the joint on the worm side 6, depending on an assembling order of the worm shaft 2 and the electric motor 7. Namely, when the electric motor 7 is assembled first, the caps 21 are fitted to the protrusion parts 32 of the joint on the motor side 8 and, when the worm shaft 2 is assembled first, the caps 21 are fitted to the protrusion parts 42 of the joint on the worm side 6.

Next, the operation and effect of the shaft coupler 100 will be explained.

As described above, the worm shaft 2 is biased by the coil spring 12 in order to reduce the backlash, and is tilted by using the first bearing 4 as the fulcrum. When the worm shaft 2 is tilted, the worm shaft 2 and the output shaft 7a of the electric motor 7 are axially misaligned, and this axial misalignment is permitted by the coupling 20 of the shaft coupler 100.

The conventional integrated-type coupling has such a tendency that tilting torque of the worm shaft 2 increases as the worm shaft 2 is tilted. When the tilting torque is high like this, the coil spring 12 is unable to bias the worm shaft 2 sufficiently, and thus the worm shaft 2 cannot be tilted smoothly and the backlash reduction of the worm reduction gear becomes unstable.

On the contrary, the coupling 20 according to this embodiment has the divided structure that is formed by the plurality of caps 21. When the worm shaft 2 is tilted, each of the caps 21 moves independently to permit the axial misalignment between the worm shaft 2 and the output shaft 7a. This prevents the tilting torque of the worm shaft 2 from increasing. Further, as the worm shaft 2 tilts smoothly, the backlash of the worm reduction gear is reduced stably. Therefore, the rotational torque of the electric motor 7 can be transmitted to the worm shaft 2 more accurately.

Further, as the coupling 20 has the divided structure that is formed by the plurality of caps 21, the rotational torque of the electric motor 7 is equally distributed to the respective caps 21 to be transmitted to the worm shaft 2. Therefore, the rotational torque of the electric motor 7 is transmitted to the worm shaft 2 efficiently, and noises are reduced. In addition, the caps 21 do not affect each other, which is advantageous for improving its life.

As described thus far, the coupling 20 operates in such a manner that the backlash of the worm reduction gear is reduced in a stable manner, and that the rotational torque of the electric motor 7 is transmitted to the worm shaft 2 efficiently.

Next, modification examples of the above-described embodiment will be explained.

Figure 5:
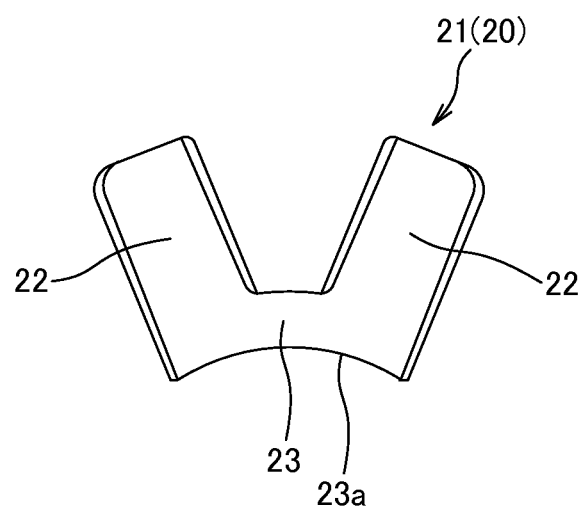
FIG. 5 is a plan view illustrating a modification example of a cap of the shaft coupler according to the embodiment of the present invention.

(1) The above-described embodiment illustrates the case where each of the caps 21 has the ring shape whose inner peripheral surface corresponds to the outer peripheral surface of each of the protrusion parts 32. Instead of this, the cap 21 may be formed by the pair of torque transmission parts 22, and the inner peripheral part 23 that couples the end parts on the center side of the pair of torque transmission parts 22, as illustrated in FIG. 5. Namely, the outer peripheral part 24 of the cap 21 may be omitted so that the outer side of the cap 21 is open. In this case, in order to prevent the cap 21 from falling off to the inner peripheral side of the joint on the motor side 8, the outer peripheral surface on the tip end side of the worm shaft 2, penetrating through the fit hole 41a of the joint on the worm side 6, needs to be configured to face the inner peripheral part 23 of the cap 21, or the outer peripheral surface on the tip end side of the output shaft 7a of the electric motor 7, penetrating through the fit hole 31a of the joint on the motor side 8, needs to be configured to face the inner peripheral part 23 of the cap 21. In this case, it is preferable that an inner peripheral surface 23a of the inner peripheral part 23 is formed to have an arc shape corresponding to the outer peripheral surface on the tip end side of the worm shaft 2 or the outer peripheral surface on the tip end side of the output shaft 7a. Further, instead of allowing the outer peripheral surface on the tip end side of the worm shaft 2 or the outer peripheral surface on the tip end side of the output shaft 7a to face the inner peripheral part 23 of the cap 21, an annular member that faces the inner peripheral part 23 of the cap 21 may be coupled to the outer peripheral surface on the tip end side of the worm shaft 2 or to the outer peripheral surface on the tip end side of the output shaft 7a, so as to prevent the cap 21 from falling off.

(2) The above-described embodiment illustrates the configuration in which each of the joint on the motor side 8 and the joint on the worm side 6 has the four protrusion parts 32 and 42. However, the number of the protrusion parts 32 and 42 is not limited to four, as long as the protrusion parts 32 and 42 are plural in number. For example, there may be three pieces of the protrusion parts 32 and 42.

Figure 6:
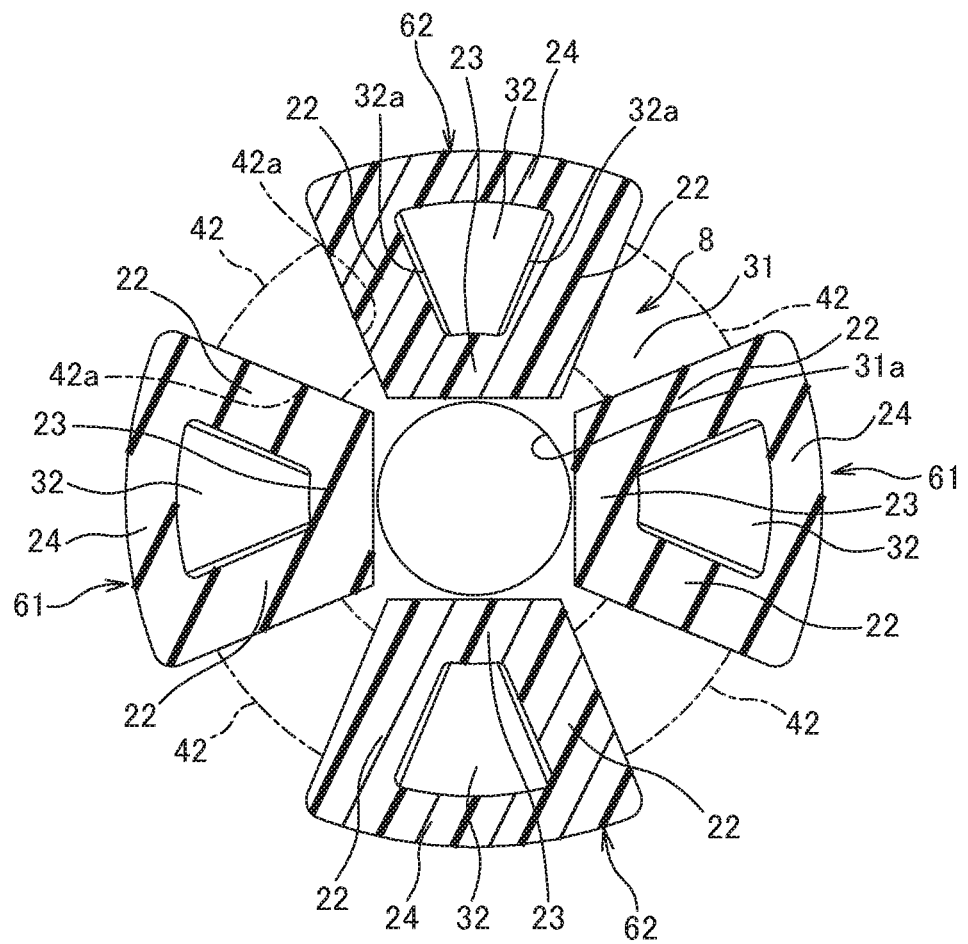
FIG. 6 is a plan view illustrating a modification example of a shaft coupler according to an embodiment of the present invention.

(3) The above-described embodiment explains the case where each of the caps 21 is formed by the 3-layered structure, in which the elastic member 51 that is flexible and has relatively small rigidity is sandwiched between the pair of resin members 52 that has relatively large rigidity. Instead of this configuration, however, the four caps may be formed by two caps 61 that are formed by elastic material that is flexible and has relatively small rigidity, such as rubber, and two caps 62 that are formed by resin material that has relatively large rigidity. In this case, it is preferable that the caps 61 formed by the elastic material and the caps 62 formed by the resin material are fitted to the protrusion parts 32 of the joint on the motor side 8 so that they are alternately arranged in the circumferential direction as shown in FIG. 6. When the caps are configured like this, it is possible to reduce manufacturing costs of the caps.

Embodiments of this invention were described above, but the above embodiments are merely examples of applications of this invention, and the technical scope of this invention is not limited to the specific constitutions of the above embodiments.

This application claims priority based on Japanese Patent Application No. 2012-039177 filed with the Japan Patent Office on Feb. 24, 2012, the entire contents of which are incorporated into this specification.

The invention claimed is:

1. An electric power steering device, comprising:
    a worm wheel configured to be provided on a steering shaft linked to a steering wheel;
    a worm shaft configured to mesh with the worm wheel;
    an electric motor configured to rotate the worm shaft;
    a biasing member configured to bias the worm shaft toward the worm wheel; and
    a shaft coupler configured to couple the worm shaft and an output shaft of the electric motor so that the worm shaft is tiltable with respect to the output shaft of the electric motor,
    wherein the shaft coupler comprises:
        a first joint on a motor side and connected to the output shaft of the electric motor;
        a second joint on a worm side and connected to the worm shaft; and
        a coupling provided between the first joint and the second joint for transmitting rotational torque of the electric motor to the worm shaft,
    wherein each of the first joint and the second joint has, a plurality of protrusion parts that extend in an axial direction,
    wherein the protrusion parts of the first joint are arranged alternately with the protrusion parts of the second joint in a circumferential direction,
    wherein the coupling comprises a plurality of caps that are fitted to the protrusion parts of the first joint or the second joint, and
    wherein each cap among the plurality of caps has a ring shape that is fitted to an outer peripheral surface of a corresponding protrusion part among the protrusion parts of the first joint or the second joint.

2. The electric power steering device according to claim 1,
    wherein the plurality of caps comprise
        first caps formed by elastic material that is flexible and has relatively small rigidity, and
        second caps formed by resin material that has relatively large rigidity, and
    wherein the first caps and the second caps are arranged alternately in the circumferential direction.

3. The electric power steering device according to claim 1,
    wherein the plurality of caps are fitted to either the protrusion parts of the first joint or the protrusion parts of the second joint.

4. An electric power steering device, comprising:
    a worm wheel configured to be provided on a steering shaft linked to a steering wheel;
    a worm shaft configured to mesh with the worm wheel;
    an electric motor configured to rotate the worm shaft;
    a biasing member configured to bias the worm shaft toward the worm wheel; and
    a shaft coupler configured to couple the worm shaft and an output shaft of the electric motor so that the worm shaft is tiltable with respect to the output shaft of the electric motor,
    wherein the shaft coupler comprises:
        a first joint on a motor side and connected to the output shaft of the electric motor;
        a second joint on a worm side and connected to the worm shaft; and
        a coupling provided between the first joint and the second joint for transmitting rotational torque of the electric motor to the worm shaft,
    wherein each of the first joint and the second joint has a plurality of protrusion parts that extend in an axial direction,
    wherein the protrusion parts of the first joint are arranged alternately with the protrusion parts of the second joint in a circumferential direction,
    wherein the coupling comprises a plurality of caps that are fitted to the protrusion parts of the first joint or the second joint, and wherein each cap among the plurality of caps comprises
   a pair of torque transmission parts each fitted in a gap between two facing plane surface parts of the protrusion parts, being neighboring to each other in the circumferential direction, of the first joint and the second joint, wherein the torque transmission parts are configured to transmit the rotational torque of the electric motor to the worm shaft; and an inner peripheral part that couples the pair of torque transmission parts and extends along an inner surface of the protrusion part on which said cap is fitted,
wherein the plurality of caps comprise
   first caps formed by elastic material that is flexible and has relatively small rigidity and
   second caps formed by resin material that has relatively large rigidity, and
wherein the first caps and the second caps are arranged alternately in the circumferential direction.

5. The electric power steering device according to claim 4,
   wherein the plurality of caps are fitted to either the protrusion parts of the first joint or the protrusion parts of the second joint.

\* \* \* \* \*